(12) United States Patent
Rae et al.

(10) Patent No.: US 11,520,903 B2
(45) Date of Patent: Dec. 6, 2022

(54) METHOD AND APPARATUS FOR IMPLEMENTING A RELEASE AUTOMATION DASHBOARD MODULE

(71) Applicant: JPMorgan Chase Bank, N.A., New York, NY (US)

(72) Inventors: Alasdair Rae, Stepps (GB); Andrew Morty, Gartocharn (GB); Kevin Mark Cameron, Giffnock (GB); Connor Esplin, Moodiesburn (GB); German Malsagov, Glasgow (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 336 days.

(21) Appl. No.: 16/845,707

(22) Filed: Apr. 10, 2020

(65) Prior Publication Data
US 2021/0319112 A1    Oct. 14, 2021

(51) Int. Cl.
*G06F 21/57*    (2013.01)
*G06F 16/25*    (2019.01)
(Continued)

(52) U.S. Cl.
CPC .......... *G06F 21/577* (2013.01); *G06F 3/0481* (2013.01); *G06F 8/60* (2013.01); *G06F 8/71* (2013.01); *G06F 16/25* (2019.01); *G06Q 10/103* (2013.01); *G06Q 50/265* (2013.01); *H04L 63/08* (2013.01); *G06F 2221/033* (2013.01); *G06F 2221/2101* (2013.01)

(58) Field of Classification Search
CPC . G06F 3/0481; G06F 8/60; G06F 8/71; G06F 16/25; G06F 21/577; G06F 2221/033; G06F 2221/2101; G06Q 10/103; G06Q 50/265; H04L 63/08
See application file for complete search history.

(56) References Cited

U.S. PATENT DOCUMENTS

| 7,953,688 | B2 * | 5/2011 | Sadeh | ................ | G06Q 10/10 706/47 |
| 8,677,315 | B1 * | 3/2014 | Anderson | ............. | G06F 8/60 717/124 |

(Continued)

OTHER PUBLICATIONS

Official communication (Search Report and Written Opinion) received in PCT Application No. PCT/US2021/026603, dated Jul. 16, 2021.

*Primary Examiner* — Douglas M Slachta
(74) *Attorney, Agent, or Firm* — Greenblum & Bernstein, P.L.C.

(57) ABSTRACT

Various methods, apparatuses/systems, and media for implementing a release automation dashboard module are disclosed. A database that stores a set of Sarbanes-Oxley (SOX) audit rules. A processor is coupled to the database via a communication network. The processor creates a release; checks the release for violations against the set of Sarbanes-Oxley (SOX) audit rules; validates that the release is scanned for cyber vulnerabilities in accordance with an organization's established practices; and authorizes deployment of the release based on a determination that the one or more features from the release does not violate the set of SOX audit rules and that the one or more features from the release meet a predetermined threshold for the cyber vulnerabilities.

18 Claims, 10 Drawing Sheets

(51) Int. Cl.

| | |
|---|---|
| *G06F 8/60* | (2018.01) |
| *G06F 3/0481* | (2022.01) |
| *G06F 8/71* | (2018.01) |
| *H04L 9/40* | (2022.01) |
| *G06Q 50/26* | (2012.01) |
| *G06Q 10/10* | (2012.01) |

(56) References Cited

U.S. PATENT DOCUMENTS

| | | | |
|---|---|---|---|
| 9,258,320 B2* | 2/2016 | Hayrynen | H04L 63/06 |
| 9,313,207 B2* | 4/2016 | Cicchitto | G06F 21/6227 |
| 2001/0025346 A1 | 9/2001 | Kayashima et al. | |
| 2006/0010047 A1* | 1/2006 | Minor | G06Q 10/10 |
| | | | 707/999.1 |
| 2011/0125895 A1* | 5/2011 | Anderson | H04L 9/3213 |
| | | | 709/224 |
| 2012/0054761 A1* | 3/2012 | Bagheri | G06F 8/20 |
| | | | 718/103 |
| 2012/0137138 A1* | 5/2012 | Gregorovic | G06F 8/61 |
| | | | 707/694 |
| 2014/0250427 A1* | 9/2014 | Wong | G06F 11/3664 |
| | | | 717/126 |
| 2016/0043892 A1* | 2/2016 | Hason | H04L 41/046 |
| | | | 709/223 |
| 2017/0295206 A1* | 10/2017 | Feiertag | H04L 63/1425 |
| 2019/0065351 A1 | 2/2019 | Rakhmilevich et al. | |
| 2019/0303541 A1* | 10/2019 | Reddy | G06F 21/64 |

* cited by examiner

METHOD AND APPARATUS FOR IMPLEMENTING A RELEASE AUTOMATION DASHBOARD MODULE

TECHNICAL FIELD

This disclosure generally relates to release management, and, more particularly, to methods and apparatuses for implementing a release automation dashboard module for automatically collating data from multiple different source systems into one self-service dashboard, thereby significantly improving release management and reducing release time.

BACKGROUND

Today's enterprises, corporations, agencies, institutions, and other organizations are facing a continuing problem of handling and processing a vast amount of software releases in a quick and expedited manner. Software development typically involves a build process that compiles source code files into binary packages for release to a production or delivery environment. Some software development projects may involve thousands, or even hundreds of thousands, of source code files having a complex dependency structure. A change in one source code file may thus cause undesirable conditions or unexpected results and failures for a large number of other source code files. A release may be a deployable software package which typically includes one or more feature compared to previous version of this software.

A software release typically includes one or more manual validation or testing procedures during which the results of a software build are tested. Software releases of complex products also usually involve multiple environments in which such testing occurs. Conventional release management services may include legacy application releasing via major quarterly releases and weekly heartbeat releases. Generation of release notes, creating ITSMs (information technology service managements), policing JIRA workflow (ensuring that all required info is present) corresponding to conventional release management services typically involve the responsibility of a team of at least four people. Such conventional release management services may have a lead time of a week.

SUMMARY

The present disclosure, through one or more of its various aspects, embodiments, and/or specific features or sub-components, may provide, among others, various systems, servers, devices, methods, media, programs, and platforms for implementing a release automation dashboard module for automatically collating data from multiple different source systems into one self-service dashboard, thereby significantly improving release management process and reducing release time, but the disclosure is not limited thereto.

According to an aspect of the present disclosure, a method for implementing a release automation dashboard module by utilizing one or more processors and one or more memories is disclosed. The method may include: creating a release; checking the release for violations against a set of Sarbanes-Oxley (SOX) audit rules; validating that the release is scanned for cyber vulnerabilities in accordance with an organization's established practices; and authorizing deployment of the release based on a determination that the one or more features from the release does not violate the set of SOX audit rules and that the one or more features from the release meet a predetermined threshold for the cyber vulnerabilities.

According to another aspect of the present disclosure, the method may further include: creating a release label corresponding to the release in a project management tool (i.e., JIRA); creating a release branch corresponding to the release in a version control system; and displaying status and summary of the release on a graphical user interface (GUI) corresponding to the release label and the release branch.

According to yet another aspect of the present disclosure, wherein the release label may correspond to a version of a software including owner information of the release which may be represented in the project management tool.

According to further aspect of the present disclosure, wherein each feature is a unit of functionality of a software system that satisfies requirements, represents a design decision, and provides a configuration option.

According to yet another aspect of the present disclosure, the method may further include: determining that one or more of the features violate the set of SOX audit rules; and notifying a user of the release, by utilizing an electronic messaging tool, the status of the release and a list of violations of the SOX audit rules.

According to an additional aspect of the present disclosure, the method may further include: identifying one or more features of the release that violate the set of SOX audit rules; and discarding the identified one or more features that violate the set of SOX audit rules from the release.

According to yet another aspect of the present disclosure, the method may further include: identifying one or more features from the release that fail to meet the predetermined threshold for the cyber vulnerabilities; and displaying the identified one or more features that fail to meet the predetermined threshold for the cyber vulnerabilities onto a graphical user interface (GUI).

According to yet another aspect of the present disclosure, the method may further include: receiving a request from a user's device to deploy the release into a production server; validating authenticity whether the user has permission to deploy the release into the production server by verifying the user's credentials with pre-stored credential information; and executing deployment of the release into the production server based on a positive verification.

According to another aspect of the present disclosure, a system for implementing a release automation dashboard module is disclosed. The system may include a database that stores a set of Sarbanes-Oxley (SOX) audit rules and a processor that is coupled to the database via a communication network. The processor may be configured to: create a release; check the release for violations against the set of Sarbanes-Oxley (SOX) audit rules; validate that the release is scanned for cyber vulnerabilities in accordance with an organization's established practices; and authorize deployment of the release based on a determination that the one or more features from the release does not violate the set of SOX audit rules and that the one or more features from the release meet a predetermined threshold for the cyber vulnerabilities.

According to yet another aspect of the present disclosure, the processor may be further configured to: create a release label corresponding to the release in a project management tool; create a release branch corresponding to the release in a version control system; and display status and summary of the release on a graphical user interface (GUI) corresponding to the release label and the release branch.

According to another aspect of the present disclosure, the processor may be further configured to: determine that one or more of the features violate the set of SOX audit rules; and notify a user of the release, by utilizing an electronic messaging tool, the status of the release and a list of violations of the SOX audit rules.

According to a further aspect of the present disclosure, the processor may be further configured to: identify one or more features of the release that violate the set of SOX audit rules; and discard the identified one or more features that violate the set of SOX audit rules from the release.

According to yet another aspect of the present disclosure, the processor may be further configured to: identify one or more features from the release that fail to meet the predetermined threshold for the cyber vulnerabilities; and display the identified one or more features that fail to meet the predetermined threshold for the cyber vulnerabilities onto a graphical user interface (GUI).

According to an additional aspect of the present disclosure, the processor may be further configured to: receive a request from a user's device to deploy the release into a production server; validate authenticity whether the user has permission to deploy the release into the production server by verifying the user's credentials with pre-stored credential information; and execute deployment of the release into the production server based on a positive verification.

According to another aspect of the present disclosure, a non-transitory computer readable medium configured to store instructions for implementing a release automation dashboard module is disclosed. The instructions, when executed, may cause a processor to perform the following: creating a release; checking the release for violations against a set of Sarbanes-Oxley (SOX) audit rules; validating that the release is scanned for cyber vulnerabilities in accordance with an organization's established practices; and authorizing deployment of the release based on a determination that the one or more features from the release does not violate the set of SOX audit rules and that the one or more features from the release meet a predetermined threshold for the cyber vulnerabilities.

According to yet another aspect of the present disclosure, the instructions, when executed, may further cause the processor to perform the following: determining that one or more of the features violate the set of SOX audit rules; and notifying a user of the release, by utilizing an electronic messaging tool, the status of the release and a list of violations of the SOX audit rules.

According to another aspect of the present disclosure, the instructions, when executed, may further cause the processor to perform the following: identifying one or more features from the release that fail to meet the predetermined threshold for the cyber vulnerabilities; and displaying the identified one or more features that fail to meet the predetermined threshold for the cyber vulnerabilities onto a graphical user interface (GUI).

According to a further aspect of the present disclosure, the instructions, when executed, may further cause the processor to perform the following: identify one or more features of the release that violate the set of SOX audit rules; and discard the identified one or more features that violate the set of SOX audit rules from the release.

According to a further aspect of the present disclosure, the instructions, when executed, may further cause the processor to perform the following: receive a request from a user's device to deploy the release into a production server; validate authenticity whether the user has permission to deploy the release into the production server by verifying the user's credentials with pre-stored credential information; and execute deployment of the release into the production server based on a positive verification.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 illustrates another exemplary release automation dashboard in accordance with an exemplary embodiment.

FIG. 9 illustrates another exemplary release automation dashboard in accordance with an exemplary embodiment

DETAILED DESCRIPTION

Figure 1:
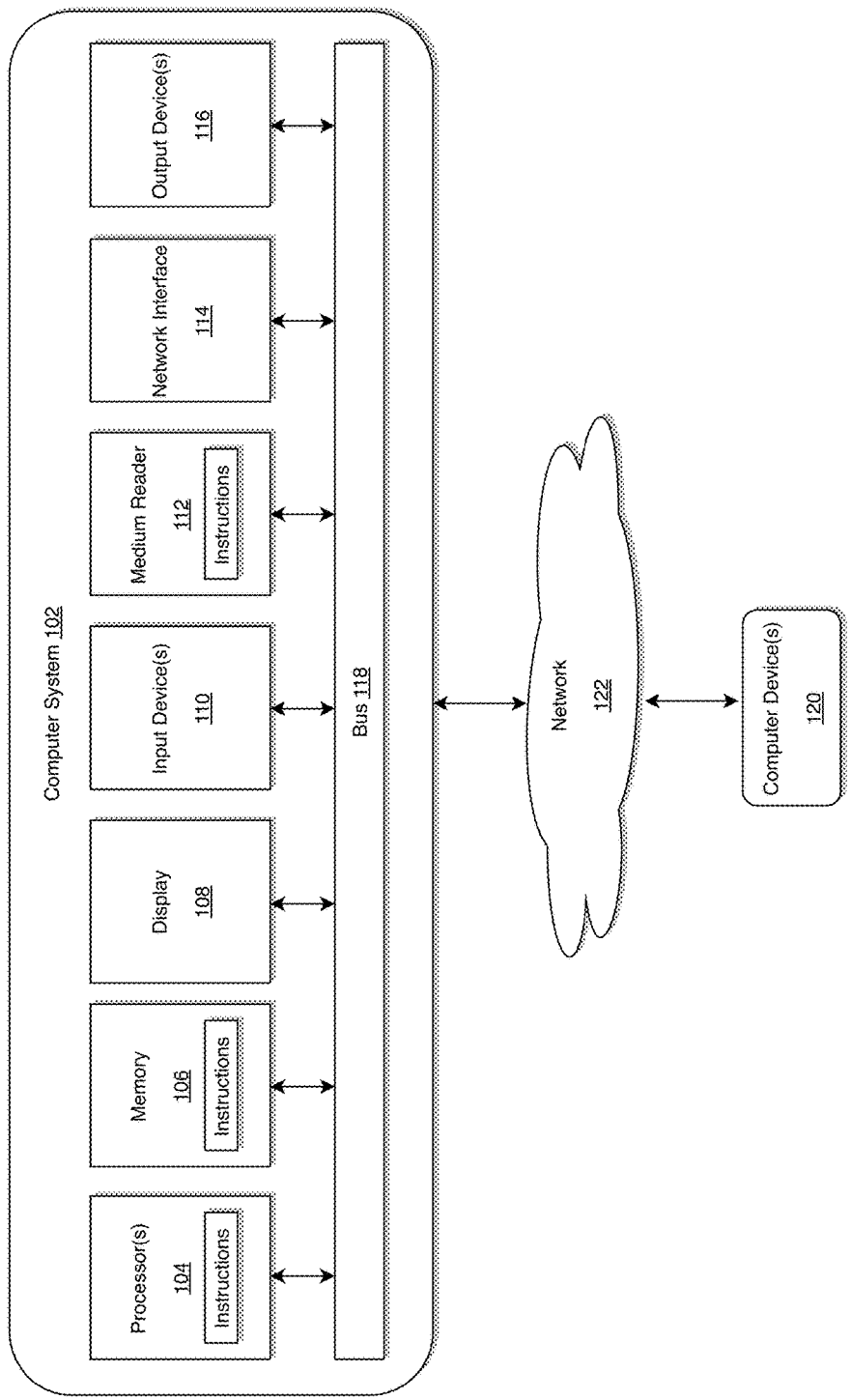
FIG. 1 illustrates a computer system for implementing a release automation dashboard module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, tools, devices and/or modules. Those skilled in the art will appreciate that these blocks, units, tools, devices, and/or modules are physically implemented by electronic (or optical) circuits such as logic circuits, discrete components, microprocessors, hardwired circuits, memory elements, wiring connections, and the like, which may be formed using semiconductor-based fabrication techniques or other manufacturing technologies. In the case of the blocks, units, tools, devices, and/or modules being implemented by microprocessors or similar, they may be programmed using software (e.g., microcode)

to perform various functions discussed herein and may optionally be driven by firmware and/or software. Alternatively, each block, unit, tool device, and/or module may be implemented by dedicated hardware, or as a combination of dedicated hardware to perform some functions and a processor (e.g., one or more programmed microprocessors and associated circuitry) to perform other functions. Also, each block, unit, tool, device, and/or module of the example embodiments may be physically separated into two or more interacting and discrete blocks, units, tools, devices, and/or modules without departing from the scope of the inventive concepts. Further, the blocks, units, tools, devices, and/or modules of the example embodiments may be physically combined into more complex blocks, units, tools, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 maybe, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a release automation dashboard module for automatically collating data from multiple different source systems into one self-service dashboard, thereby significantly improving release management process and reducing release time, but the disclosure is not limited thereto.

Figure 2:
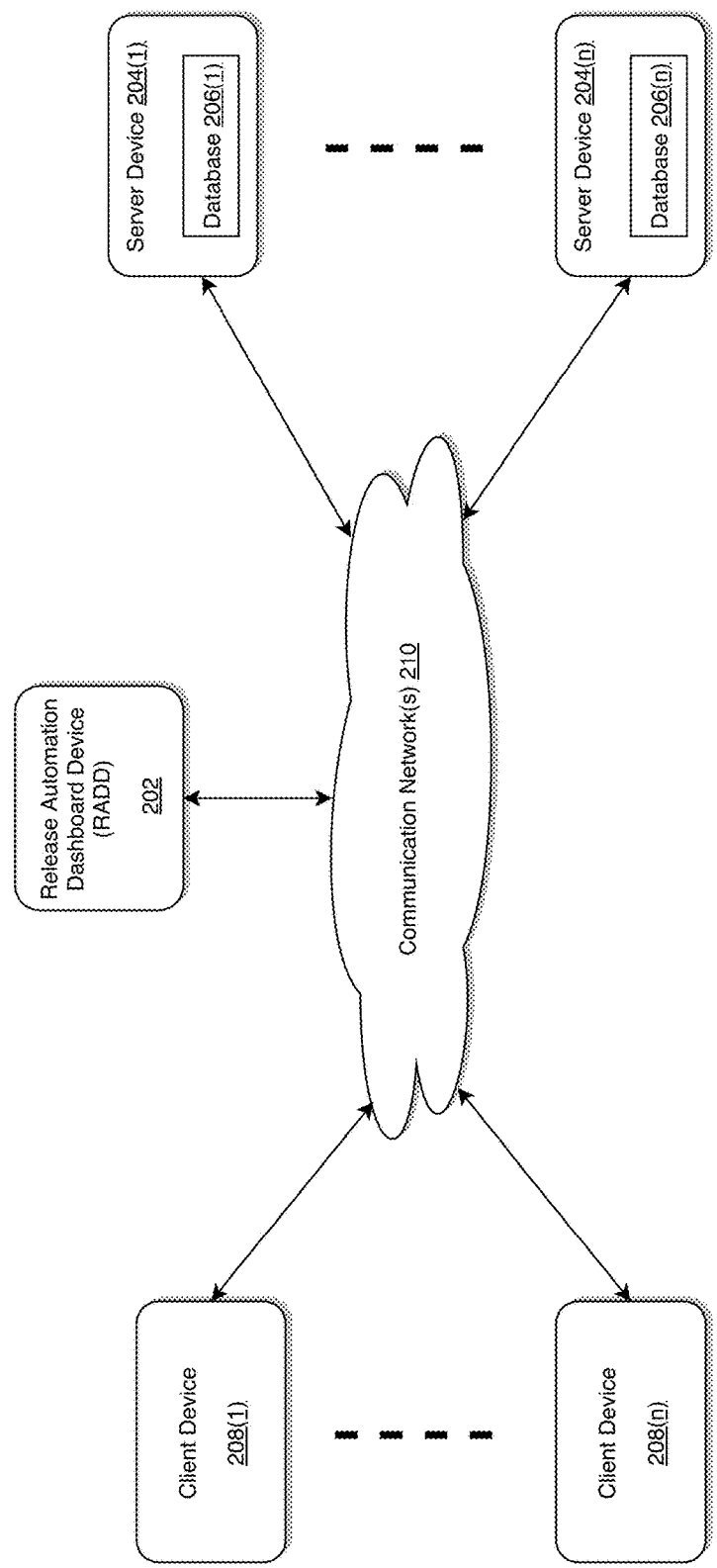
FIG. 2 illustrates an exemplary diagram of a release automation dashboard device in accordance with an exemplary embodiment.

Referring to FIG. 2, a schematic of an exemplary network environment 200 for implementing a release automation dashboard device (RADD) of the instant disclosure is illustrated.

Conventional system, that does not implement an RADD of the instant disclosure, may not be able to handle and process a vast amount of releases in a quick and expedited manner. For example, generation of release notes, creating ITSMs (information technology service managements), policing JIRA workflow (ensuring that all required info is present) corresponding to conventional release management services may involve the responsibility of a team of at least four people. Such conventional release management services may have a lead time of a week for a release.

According to exemplary embodiments, the above-described problems associated with conventional system may be overcome by implementing an RADD 202 having a release automation dashboard module as illustrated in FIG. 2 automatically collating data from multiple different source systems into one self-service dashboard, thereby significantly improving release management process and reducing release time, but the disclosure is not limited thereto.

The RADD 202 may be the same or similar to the computer system 102 as described with respect to FIG. 1.

The RADD 202 may store one or more applications that can include executable instructions that, when executed by the RADD 202, cause the RADD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RADD 202 itself, may be located in virtual server(s) running in a cloud-based computing environment rather than being tied to one or more specific physical network computing devices. Also, the application(s) may be running in one or more virtual machines (VMs) executing on the RADD 202. Additionally, in one or more embodiments of this technology, virtual machine(s) running on the RADD 202 may be managed or supervised by a hypervisor.

In the network environment 200 of FIG. 2, the RADD 202 is coupled to a plurality of server devices 204(1)-204(n) that hosts a plurality of databases 206(1)-206(n), and also to a plurality of client devices 208(1)-208(n) via communication network(s) 210. A communication interface of the RADD 202, such as the network interface 114 of the computer system 102 of FIG. 1, operatively couples and communicates between the RADD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RADD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RADD 202 may be a standalone device or integrated with one or more other devices or apparatuses, such as one or more of the server devices 204(1)-204(n), for example. In one particular example, the RADD 202 may be hosted by one of the server devices 204(1)-204(n), and other arrangements are also possible. Moreover, one or more of the devices of the RADD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RADD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the RADD 202 that may be configured for automatically collating data from multiple different source systems into one self-service dashboard, thereby significantly improving release management process and reducing release time, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the RADD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RADD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RADD 202, the server devices 204(1)-204(n), or the client devices 208(1)-208(n), for example, may be configured to operate as virtual instances on the same physical machine. For example, one or more of the RADD 202, the server devices 204(1)-204(n), or the client devices 208(1)-208(n) may operate on the same physical device rather than as separate devices communicating through communication network(s) 210. Additionally, there may be more or fewer RADDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
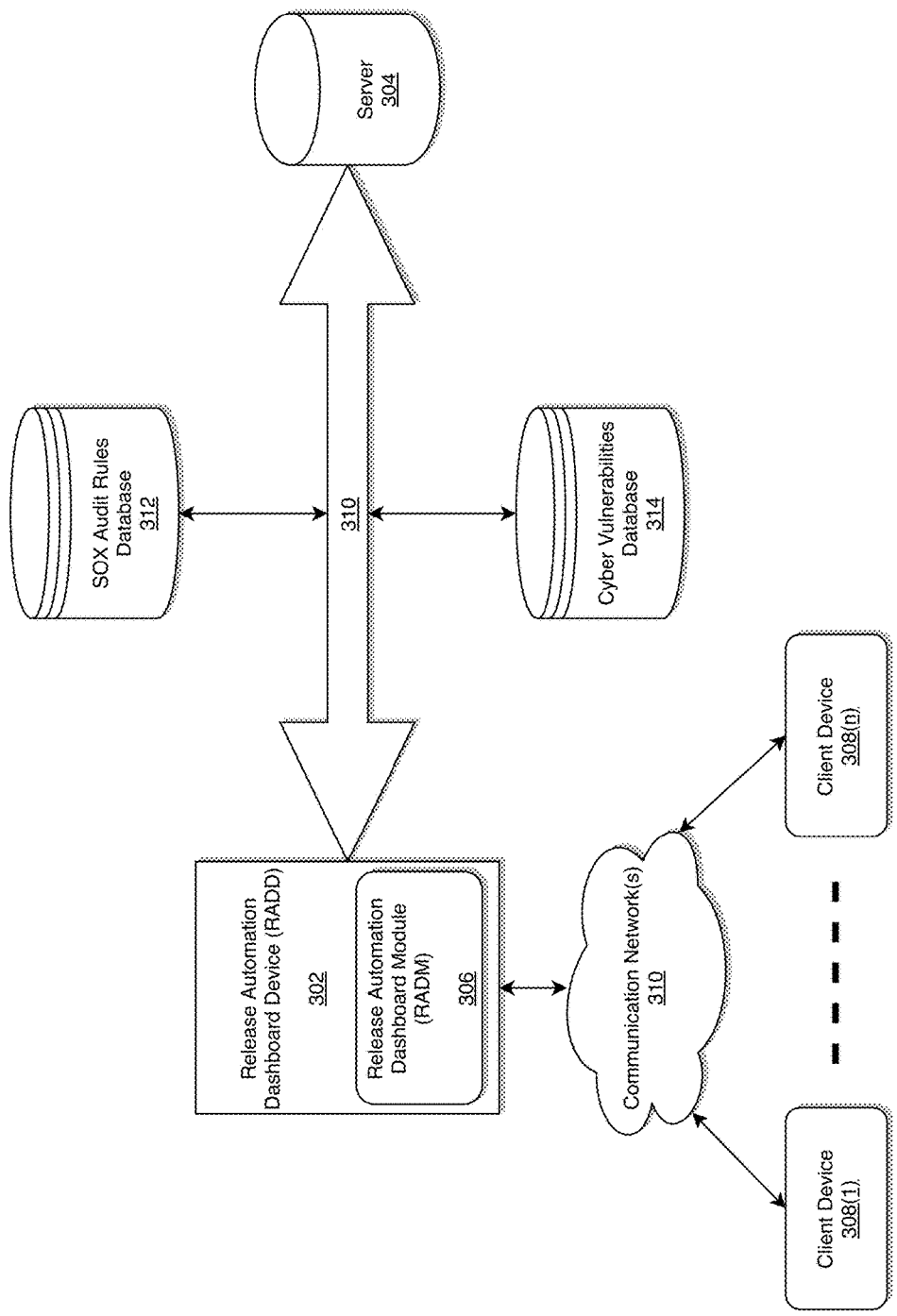
FIG. 3 illustrates a system diagram for implementing a release automation dashboard device with a release automation dashboard module in accordance with an exemplary embodiment.

FIG. 3 illustrates a system diagram for implementing an RADD with a release automation dashboard module (RADM) in accordance with an exemplary embodiment.

As illustrated in FIG. 3, in the system 300, according to exemplary embodiments, the RADD 302 including the RADM 306 may be connected to a server 304, a Sarbanes-Oxley (SOX) audit rules database 312, and a cyber vulnerabilities database 314 via a communication network 310, but the disclosure is not limited thereto. For example, according to exemplary embodiments, the RADM 306 may be connected to any desired database besides the SOX audit rules database 312 and the cyber vulnerabilities database 314.

According to exemplary embodiments, the (SOX) audit rules database 312 may be configured to store SOX audit rules. The SOX audit rules are United States (U.S.) federal law that set new or expanded requirements for all U.S. public company boards, management and public accounting firms. A number of provisions of the SOX audit rules also apply to privately held companies, such as the willful destruction of evidence to impede a federal investigation. Major sections of the SOX audit rules cover responsibilities of a public corporation's board of directors, add criminal penalties for certain misconduct, and require the Securities and Exchange Commission to create regulations to define how public corporations are to comply with the law.

According to exemplary embodiments, the cyber vulnerabilities database 314 may be configured to store rules and predetermined threshold values for determining cyber vulnerabilities in accordance with an organization's established practices, thereby resolving and/or mitigating cybersecurity vulnerability of components of a release. A release may be a deployable software package which typically includes one or more feature compared to previous version of this software. According to exemplary embodiments, the RADM 306 may be configured to scan the release for cyber vulnerabilities by implementing the cybersecurity vulnerability management processes as disclosed in commonly assigned U.S. Pat. No. 10,372,915, the disclosure of which is hereby incorporated herein by reference.

According to exemplary embodiment, the RADD 302 is described and shown in FIG. 3 as including the RADM 306, although it may include other rules, policies, modules, databases, or applications, for example. According to exemplary embodiments, the cyber vulnerabilities database 314 may be embedded within the RADD 302. According to exemplary embodiments, the server 304 may also be a database which may be configured to store information including the metadata, but the disclosure is not limited thereto. According to exemplary embodiments, the RADM 306 may also be referred to as a processor.

According to exemplary embodiments, the RADM 306 may be configured to receive continuous feed of data from the server 304, the SOX audit rules database 312, and the cyber vulnerabilities database 314 via the communication network 310. According to exemplary embodiments, the RADM 306 may also be configured to communicate with the client devices 308(1)-308(n) (e.g., user's devices) via the communication network 310, but the disclosure is not limited thereto. According to exemplary embodiments, the machine learning models may be trained using CPUs and GPUs for scanning the release for cyber vulnerabilities, but the disclosure is not limited thereto.

As will be described below, the RADM 306 may be configured to create a release; check the release for violations against the set of Sarbanes-Oxley (SOX) audit rules; validate that the release is scanned for cyber vulnerabilities in accordance with an organization's established practices; and authorize deployment of the release based on a determination that the one or more features from the release does not violate the set of SOX audit rules and that the one or more features from the release meet a predetermined threshold for the cyber vulnerabilities.

According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the client devices 308(1)-308(n) may communicate with the RADD 302 via broadband or cellular communication. Of course, these embodiments are merely exemplary and are not limiting or exhaustive.

Figure 4:
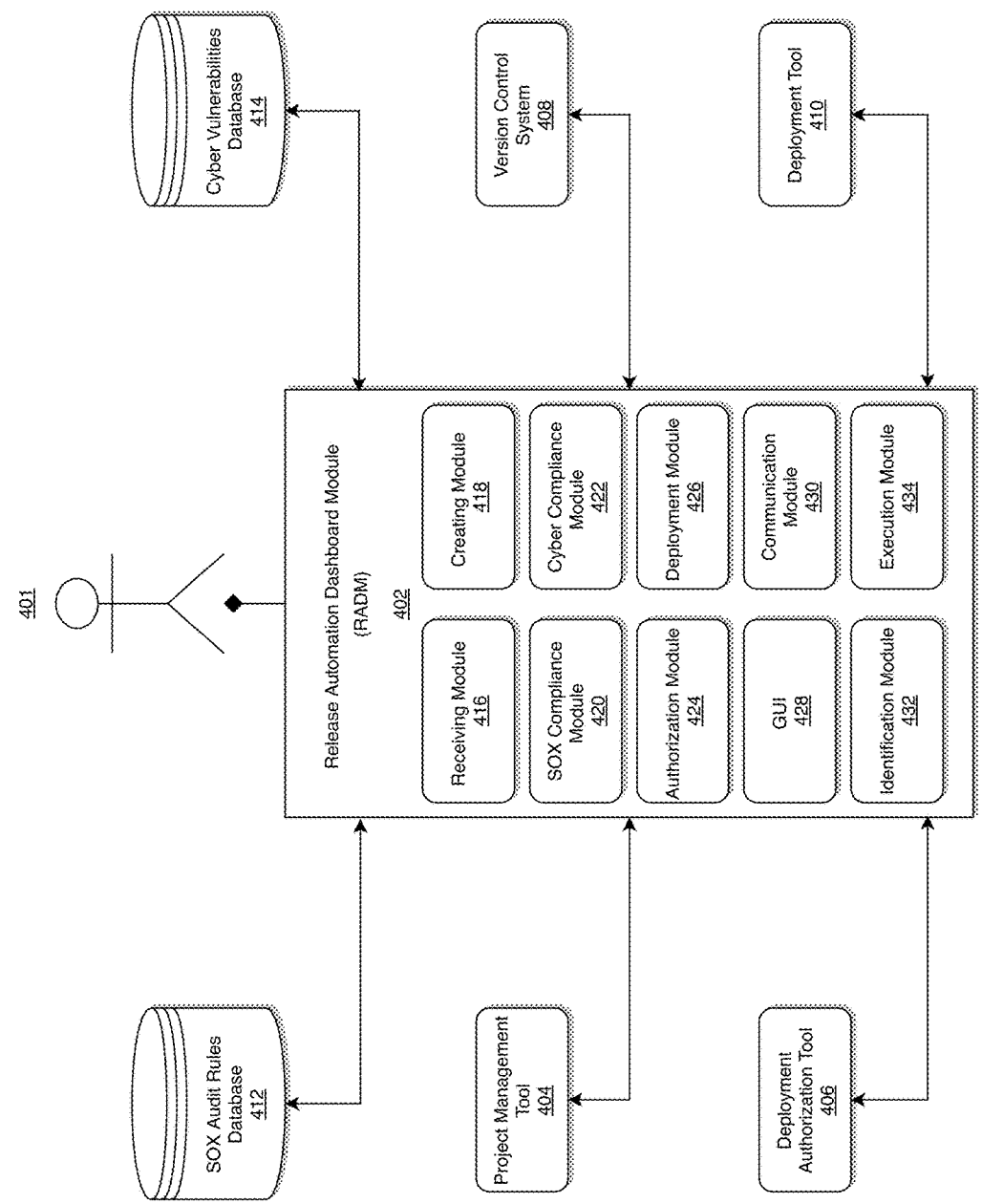
FIG. 4 illustrates a system diagram for implementing a release automation dashboard module of FIG. 3 in accordance with an exemplary embodiment.

FIG. 4 illustrates a system diagram for implementing a release automation dashboard module (RADM) of FIG. 3 in accordance with an exemplary embodiment. As illustrated in FIG. 4, the system 400 may include an RADM 402, a project management tool 404, a deployment authorization tool 406, a version control system 408, a deployment tool 410, a SOX audit rules database 412, a cyber vulnerabilities database 414, a server (not shown), and a communication network (not shown).

According to exemplary embodiments, the SOX audit rules database 412 may be the same or similar to the SOX audit rules database 312 and the cyber vulnerabilities database 412 may be the same or similar to the cyber vulnerabilities database 314 as illustrated in FIG. 3. Further the server may be the same or similar to the server 304 and the communication network 310 as illustrated in FIG. 3.

As illustrated in FIG. 4, the RADM 406 may include receiving module 416, a creating module 418, a SOX compliance module 420, a cyber compliance module 422, an authorization module 424, a deployment module 426, a GUI 428, a communication module 430, an identification module 432, and an execution module 434. According to exemplary embodiments, the RADM 402 may include various systems that are managed and operated by an organization by utilizing user's device (e.g., client devices 308(1)-308(n) as illustrated in FIG. 3).

Referring to FIGS. 3 and 4, the process may be executed via the communication network 310 which may comprise plural networks as described above. For example, in an exemplary embodiment, the various components of the RADM 406 may communicate with the project management tool 404, the deployment authorization tool 406, the version control system 408, the deployment tool 410, the SOX audit rules database 412, the cyber vulnerabilities database 414, and the server 304 via the communication module 430 and the communication network 310. Of course, these embodiments are merely exemplary and are not limiting or exhaustive.

According to exemplary embodiments, each of the receiving module 416, the creating module 418, the SOX compliance module 420, the cyber compliance module 422, the authorization module 424, the deployment module 426, the communication module 430, the identification module 432, the execution module 434 the project management tool 404, deployment authorization tool 406, and the deployment tool 410 may be implemented by microprocessors or similar, they may be programmed using software (e.g., microcode) to perform various functions discussed herein. Alternatively, each of the receiving module 416, the creating module 418, the SOX compliance module 420, the cyber compliance module 422, the authorization module 424, the deployment module 426, the communication module 430, the identification module 432, the execution module 434 the project management tool 404, deployment authorization tool 406, and the deployment tool 410 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the receiving module 416, the creating module 418, the SOX compliance module 420, the cyber compliance module 422, the authorization module 424, the deployment module 426, the communication module 430, the identification module 432, the execution module 434 the project management tool 404, deployment authorization tool 406, and the deployment tool 410 may be physically separated into two or more interacting and discrete blocks, units, devices, and/or modules without departing from the scope of the inventive concepts.

According to exemplary embodiments, the receiving module 416 may be configured to receive a request to create a release. The user 401 may utilize the GUI 428 to create the release. The user 401 may be referred to as a release owner.

Figure 5:
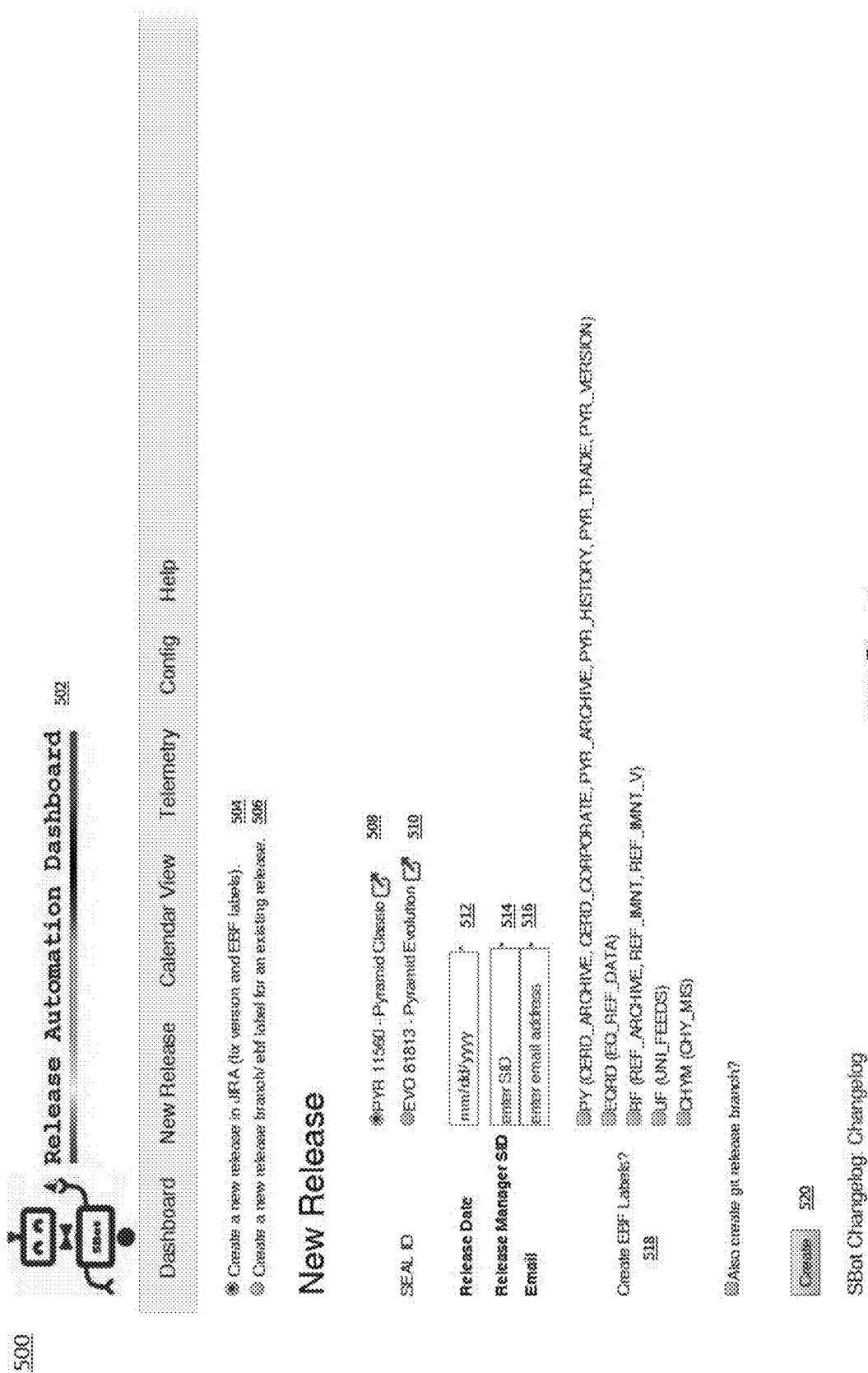
FIG. 5 illustrates an exemplary release automation dashboard in accordance with an exemplary embodiment.

FIG. 5 illustrates an exemplary display 500 that illustrates a release automation dashboard 502 implemented by the RADM 402. According to exemplary embodiments, as illustrated in the dashboard 502, the user 401 can make a selection for "create a new release in JIRA (fix version and EBF labels)" 504 or for "create a new release branch/ebf label for an existing release" 506. According to exemplary embodiments, for a new release, the user 401 can make a selection for "PYR 11560—Pyramid Classic" 508 or "EVO 81813—Pyramid Evolution" 510. According to exemplary embodiments, the release automation dashboard 502 may provide the user 401 to insert release date 512, release manager SID 514, and email address 516. The user 401 can also have the option to select a desired EBF label 518.

Referring to FIGS. 3-5, when the user 401 clicks the create icon 520, the creating module 418 may be configured to create the release. The release may be a deployable software package which typically includes one or more feature compared to previous version of this software. According to exemplary embodiments, the creating module 418 may be configured to create a release label corresponding to the release in the project management tool (i.e., JIRA) 404 and to create a release branch corresponding to the release in the version control system 408. The RADM 402 may be configured to display 500 status and summary of the release on the release automation dashboard 502 corresponding to the release label and the release branch. According to exemplary embodiments, the release automation dashboard 502 may also be referred to as a GUI. According to exemplary embodiments, the release label may correspond to a version of a software including owner information of the release which is represented in the project management tool 404.

According to exemplary embodiments, the SOX compliance module 420 may be configured to access the SOX audit rules database 412 to check the release for violations against a set of Sarbanes-Oxley (SOX) audit rules stored in the SOX audit rules database 412.

Figure 6:
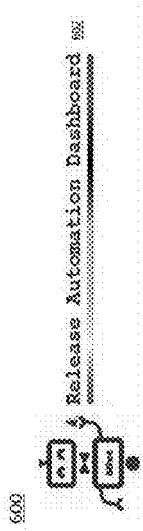
FIG. 6 illustrates another exemplary release automation dashboard in accordance with an exemplary embodiment.

According to exemplary embodiments, FIG. 6 illustrates a display 600 that illustrates a release automation dashboard 602 displaying a table having a reload column 603, an upcoming releases column 604, an owner column 606, a release start column 608, a JIRA count column 610, an SSAP (Statements of Standards Accounting Practice) compliance column 612, a controls compliance column 614, a release plan column 616, a Jules builds column 618, an auto ITSM (Information Technology Service Management) column 620 and an automated deployment column 622.

Figure 7:
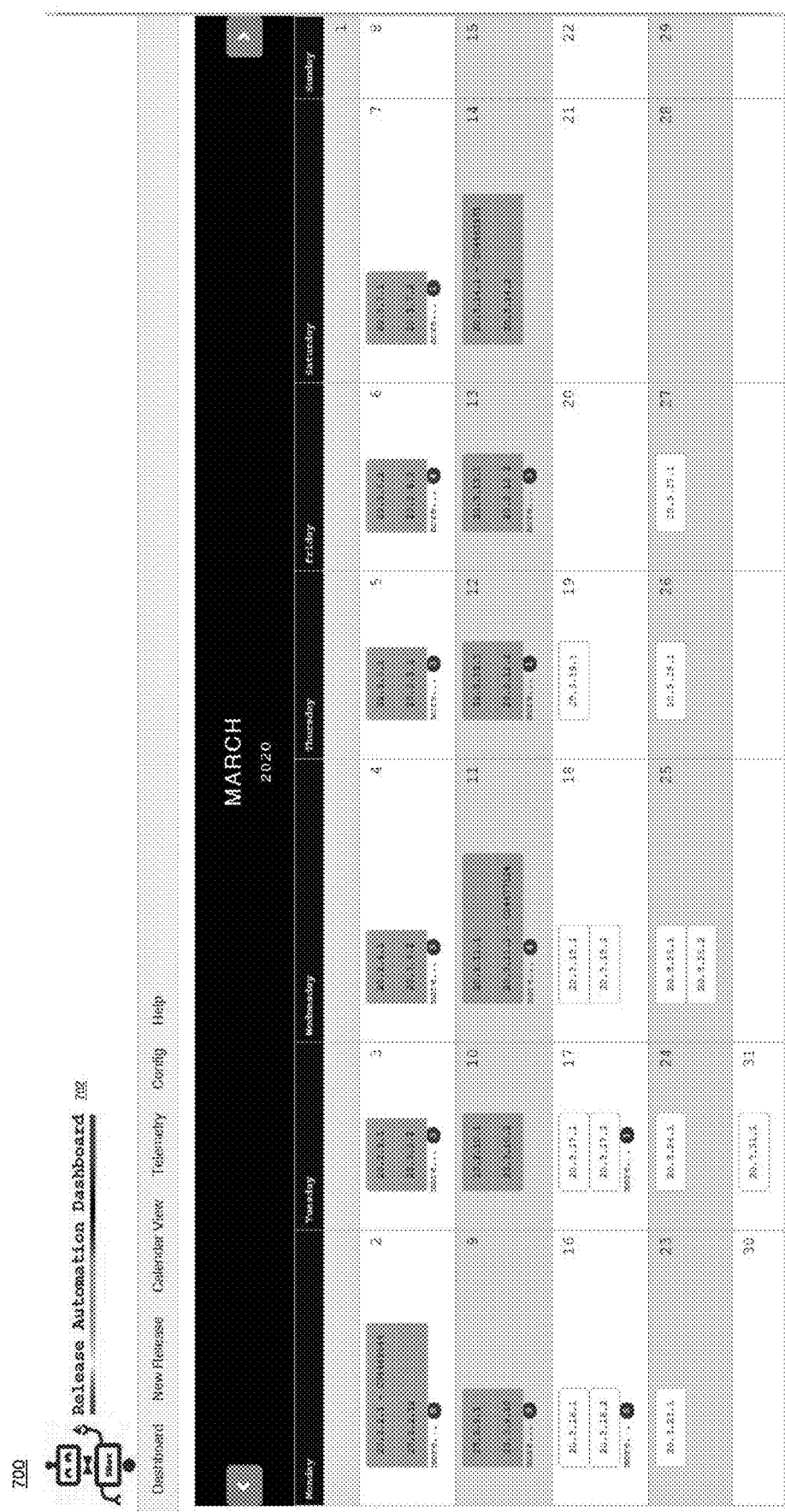
FIG. 7 illustrates another exemplary release automation dashboard in accordance with an exemplary embodiment.

According to exemplary embodiments, FIG. 7 illustrates a display 700 that illustrates a release automation dashboard 702 displaying a table having a calendar view of the releases.

According to exemplary embodiments, FIG. 8 illustrates a display 800 that illustrates a release automation dashboard 802 displaying a table for audit breaks. For example the audit breaks table may include a column for JIRA identifiers, a column for lead members' names, a column for category, a column for description and a column for current value. For example, the audit breaks table illustrated on the release automation dashboard 802 displays that for the JIRA identifier PYE-73397, lead name is "unknown," category is "CHGMGT," description is "Jira status is Scope. All JIRAs must be ready for release (signed-off) to allow regression testing of the frozenVB. The ITSM cannot be raised unless regression passes," and the current value is "Scope." For example, the audit breaks table illustrated on the release automation dashboard 802 displays that for the JIRA identifier PYE-73332, lead name is "Name 1," category is "CHGMGT," description is "Jira status is Review. All JIRAs must be ready for release (signed-off) to allow regression testing of the frozenVB. The ITSM cannot be raised unless regression passes," and the current value is "Review."

According to exemplary embodiments, the cyber compliance module 422 may be configured to access cyber vulnerabilities database 414 to validate that the release is scanned for cyber vulnerabilities in accordance with an organization's established practices.

According to exemplary embodiments, the deployment authorization tool 406 and the authorization module 424 may be configured to authorize deployment of the release based on a determination by the SOX compliance module 420 that the one or more features from the release does not violate the set of SOX audit rules and based on a determination by the cyber compliance module 422 that the one or more features from the release meet a predetermined threshold for the cyber vulnerabilities. According to exemplary embodiments, the cyber compliance module 422 may be configured to scan the release for cyber vulnerabilities by implementing the cybersecurity vulnerability management processes as disclosed in commonly assigned U.S. Pat. No. 10,372,915, the disclosure of which is hereby incorporated herein by reference. According to exemplary embodiments, each feature may be a unit of functionality of a software system that satisfies requirements, represents a design decision, and provides a configuration option.

According to exemplary embodiments, the SOX compliance module 420 may be configured to determine that one or more of the features violate the set of SOX audit rules by accessing the SOX audit rules database 412 and comparing the SOX audit rules with the feature rules of the release. The communication module 430 may be configured to notify a user of the release, by utilizing an electronic messaging tool, the status of the release and a list of violations of the SOX audit rules. Notification may be sent via electronic e-mail, SMS, etc., but the disclosure is not limited thereto.

According to exemplary embodiments, the identification module 432 may be configured to identify one or more features of the release that violate the set of SOX audit rules and the execution module 434 may be configured to discard the identified one or more features that violate the set of SOX audit rules from the release.

According to exemplary embodiments, identification module 432 may be configured to identify one or more features from the release that fail to meet the predetermined threshold for the cyber vulnerabilities scanned by the cyber compliance module 422 and the RADM 402 may be configured to display the identified one or more features that fail to meet the predetermined threshold for the cyber vulnerabilities onto the GUI 428.

Figure 9:
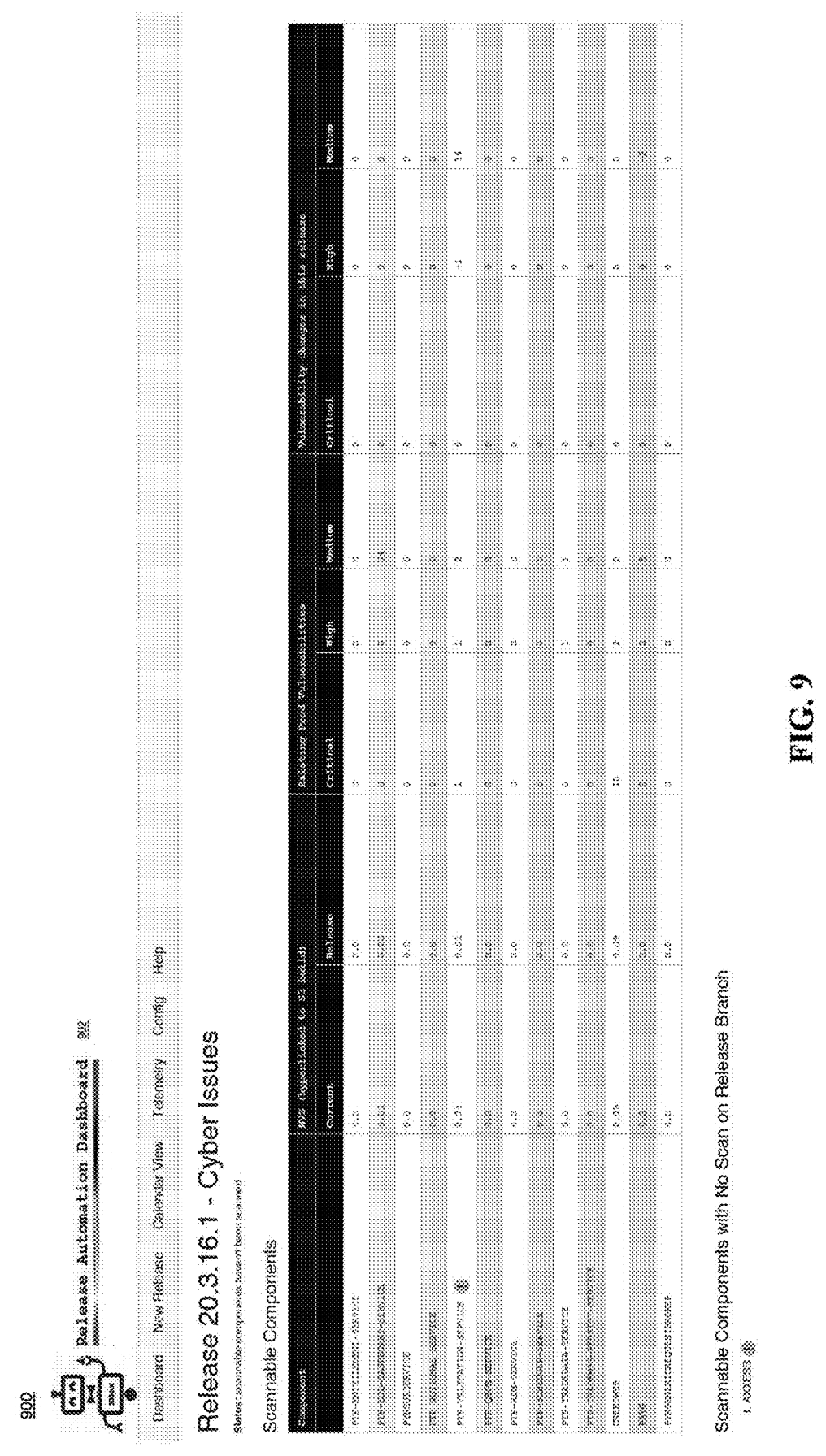

Exemplary displays related to cyber vulnerabilities have been illustrated in FIG. 9.

For example, FIG. 9 illustrates a display 900 in which a release automation dashboard 902 displays cyber issues related to the release. According to exemplary embodiments, the release automation dashboard 902 illustrates the status as scannable components haven't been scanned. An exemplary scannable components table may include a column for component, a column for NVS (hyperlinked to s3 build) a column for existing product vulnerabilities, and a column for vulnerability changes in this release.

For example, the table illustrated in the release automation dashboard 902 illustrates that for the component PTP-EOD-DASHBOARD-SERVICE, the value for current NVS (hyperlinked to s3 build) is 0.02 and the value for release is also 0.02. The table illustrated in the release automation dashboard 902 also illustrates that for the component PTP-EOD-DASHBOARD-SERVICE, the values for existing product vulnerabilities are as follows: critical 0; high 0, and medium 74. The table illustrated in the release automation dashboard 902 also illustrates that for the component PTP-EOD-DASHBOARD-SERVICE, the values for vulnerabilities changes in this release are as follows: critical 0; high 0, and medium 0.

For example, the table illustrated in the release automation dashboard 902 illustrates that for the component PTP-VALIDATION-SERVICE, the value for current NVS (hyperlinked to s3 build) is 0.34 and the value for release is also 0.01. The table illustrated in the release automation dashboard 902 also illustrates that for the component PTP-VALIDATION-SERVICE, the values for existing product vulnerabilities are as follows: critical 1; high 1, and medium 2. The table illustrated in the release automation dashboard 902 also illustrates that for the component PTP-VALIDATION-SERVICE, the values for vulnerabilities changes in this release are as follows: critical 0; high −1, and medium 14.

According to exemplary embodiments, the receiving module 416 may be configured to receive a request from a user's device (e.g., client devices 308(1)-308(n)) to deploy the release into a production server. The authorization module 424 and the deployment authorization tool 406 may be configured to validate authenticity whether the user has permission to deploy the release into the production server by verifying the user's credentials with pre-stored credential information. The deployment module 426 and the deployment tool 410 may be configured to execute deployment of the release into the production server based on a positive verification by the authorization module 424 and the deployment authorization tool 406.

According to exemplary embodiments, the release automation dashboard 502, 602, 702, 802, 902 may be a python flask web application dashboard that may be configured to pull release information together into one platform. According to exemplary embodiments, JIRA fix versions, branches in bitbucket (web-based version control repository hosting service for source code and development project), and ITSMs may be created on demand. According exemplary embodiments, the RADM 402 may be configured to automatically generate release notes based on the components in the release. According to exemplary embodiments, the RADM 402 may be configured to pull data from JIRA and bitbucket via an application processing interface (API) to tie information together. The RADM 402 is configured to ensure ITSMs may not be raised for a release if there are any failed Jules builds, any outstanding pull requests etc.

According to exemplary embodiments, a non-transitory computer readable medium may be configured to store instructions for implementing the RADM 402 for automatically collating data from multiple different source systems into one self-service dashboard, thereby significantly improving release management and reducing release time. According to exemplary embodiments, the instructions, when executed, may cause a processor embedded within the RADM 402 to perform the following: creating a release; checking the release for violations against a set of Sarbanes-Oxley (SOX) audit rules; validating that the release is scanned for cyber vulnerabilities in accordance with an organization's established practices; and authorizing deployment of the release based on a determination that the one or more features from the release does not violate the set of SOX audit rules and that the one or more features from the release meet a predetermined threshold for the cyber vulnerabilities. The processor may be the same or similar to the processor 104 as illustrated in FIG. 1 or the processor embedded within RADD 202, RADD 302, RADM 306, and RADM 402.

According to exemplary embodiments, the instructions, when executed, may cause a processor embedded within the RADM 402 to perform the following: determining that one or more of the features violate the set of SOX audit rules; and notifying a user of the release, by utilizing an electronic messaging tool, the status of the release and a list of violations of the SOX audit rules.

According to exemplary embodiments, the instructions, when executed, may cause a processor embedded within the RADM 402 to perform the following: identifying one or more features from the release that fail to meet the predetermined threshold for the cyber vulnerabilities; and displaying the identified one or more features that fail to meet the predetermined threshold for the cyber vulnerabilities onto a graphical user interface (GUI).

According to exemplary embodiments, the instructions, when executed, may cause a processor embedded within the RADM 402 to perform the following: identify one or more features of the release that violate the set of SOX audit rules; and discard the identified one or more features that violate the set of SOX audit rules from the release.

According to exemplary embodiments, the instructions, when executed, may cause a processor embedded within the RADM 402 to perform the following: receiving a request from a user's device to deploy the release into a production server; validating authenticity whether the user has permission to deploy the release into the production server by verifying the user's credentials with pre-stored credential information; and executing deployment of the release into the production server based on a positive verification.

Figure 10:
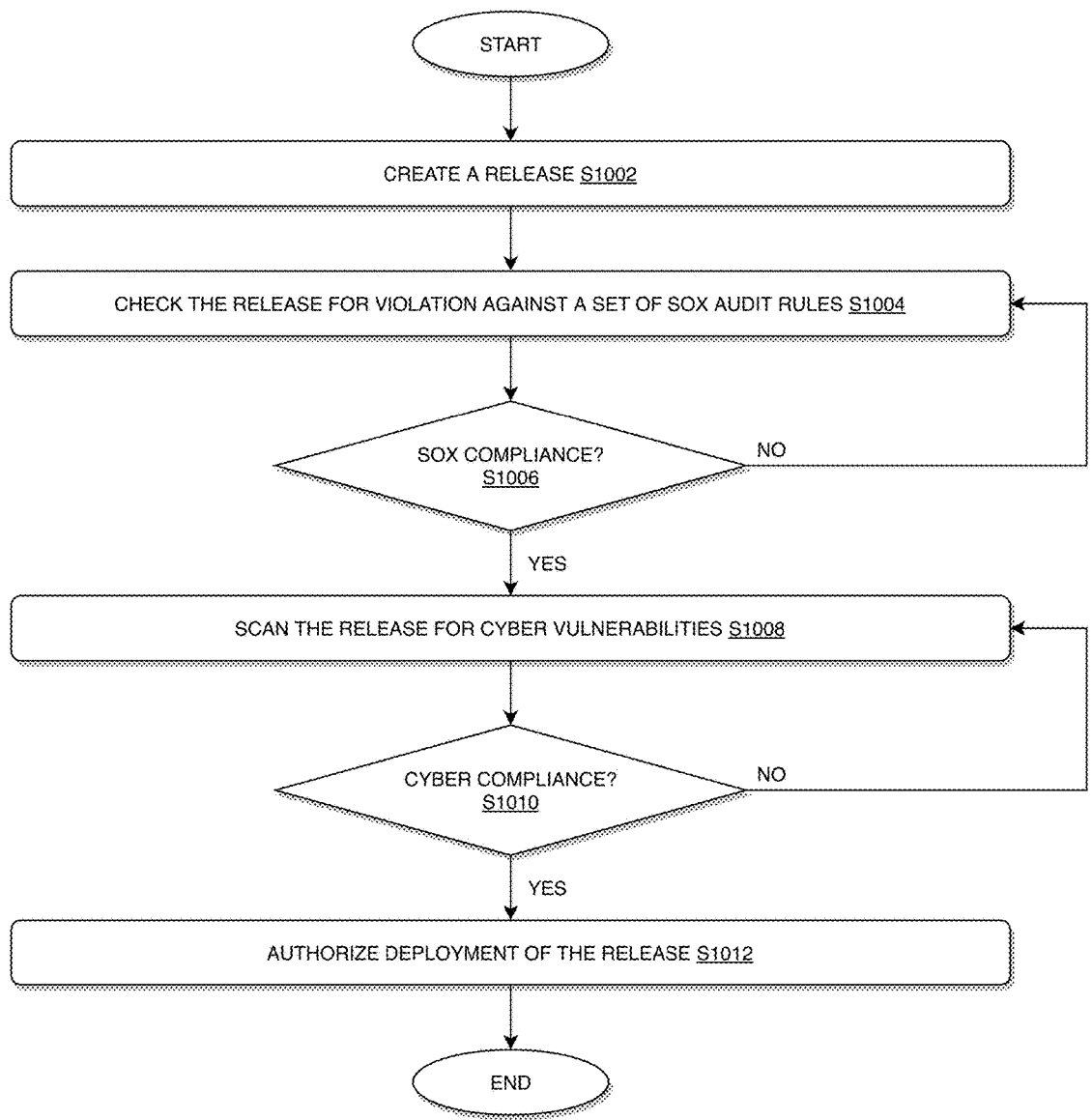
FIG. 10 illustrates a flow chart for implementing a release automation dashboard in accordance with an exemplary embodiment.

FIG. 10 illustrates a flow chart for implementing a release automation dashboard module in accordance with an exemplary embodiment.

In the process 1000 of FIG. 10, at step S1002, a release may be created. The release may be a deployable software package which typically includes one or more feature compared to previous version of this software. At step S1004, the release may be checked for violations against a set of Sarbanes-Oxley (SOX) audit rules. At step S1006, it may be determined whether the release complies with the SOX audit rules. If it is determined at step S1006 that the release complies with the SOX audit rules, at step S1008, the release may be scanned for any cyber vulnerabilities. At step S1010, it may be determined whether the release complies with cyber vulnerabilities in accordance with an organization's established practices. If it is determined at step S1010 that the release complies with cyber vulnerabilities, at step S1012, deployment of the release may be authorized.

According to exemplary embodiments, the process 1000 may further include: creating a release label corresponding to the release in a project management tool (i.e., JIRA); creating a release branch corresponding to the release in a version control system; and displaying status and summary of the release on a graphical user interface (GUI) corresponding to the release label and the release branch.

According to exemplary embodiments, the process 1000 may further include: determining that one or more of the features violate the set of SOX audit rules; and notifying a user of the release, by utilizing an electronic messaging tool, the status of the release and a list of violations of the SOX audit rules.

According to exemplary embodiments, the process 1000 may further include: identifying one or more features of the release that violate the set of SOX audit rules; and discarding the identified one or more features that violate the set of SOX audit rules from the release.

According to exemplary embodiments, the process 1000 may further include: identifying one or more features from the release that fail to meet the predetermined threshold for the cyber vulnerabilities; and displaying the identified one or more features that fail to meet the predetermined threshold for the cyber vulnerabilities onto a graphical user interface (GUI).

According to exemplary embodiments, the process 1000 may further include: receiving a request from a user's device to deploy the release into a production server; validating authenticity whether the user has permission to deploy the release into the production server by verifying the user's credentials with pre-stored credential information; and executing deployment of the release into the production server based on a positive verification.

According to exemplary embodiments as disclosed above in FIGS. 1-10, technical improvements effected by the instant disclosure may include a platforms for implementing a release automation dashboard module for automatically collating data from multiple different source systems into one self-service dashboard, thereby significantly improving release management process and reducing release time, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a release automation dashboard module by utilizing one or more processors and one or more memories, the method comprising:
creating a release;
checking, in response to creating, the release for violations against a set of Sarbanes-Oxley (SOX) audit rules;
determining, in response to checking, whether the release complies with the SOX audit rules;
scanning, in response to determining that the release complies with the SOX audit rules, the release for cyber vulnerabilities in accordance with an organization's established practices;
validating, in response to scanning, that the release is scanned for cyber vulnerabilities in accordance with the organization's established practices; and
authorizing deployment of the release based on a determination that one or more features from the release does not violate the set of SOX audit rules and that the one or more features from the release meet a predetermined threshold for the cyber vulnerabilities;
creating a release label corresponding to the release in a project management tool;
creating a release branch corresponding to the release in a version control system; and
displaying status and summary of the release on a graphical user interface (GUI) corresponding to the release label and the release branch,
wherein the GUI displays cyber issues related to the release in a table format that illustrates status of the release as scannable components have not been scanned, wherein the table includes a column for component, a column for non-volatile storage hyperlinked to a private cloud build, a column for existing product vulnerabilities, and a column for vulnerability changes in the release.

2. The method according to claim 1, wherein the release label corresponds to a version of a software including owner information of the release which is represented in the project management tool.

3. The method according to claim 1, wherein each feature is a unit of functionality of a software system that satisfies requirements, represents a design decision, and provides a configuration option.

4. The method according to claim 1, further comprising:
determining that one or more of the features violate the set of SOX audit rules; and
notifying a user of the release, by utilizing an electronic messaging tool, thea status of the release and a list of violations of the SOX audit rules.

5. The method according to claim 1, further comprising:
identifying one or more features of the release that violate the set of SOX audit rules; and
discarding the identified one or more features that violate the set of SOX audit rules from the release.

6. The method according to claim 1, further comprising:
identifying one or more features from the release that fail to meet the predetermined threshold for the cyber vulnerabilities; and
displaying the identified one or more features that fail to meet the predetermined threshold for the cyber vulnerabilities onto a graphical user interface (GUI).

7. The method according to claim 1, further comprising:
receiving a request from a user's device to deploy the release into a production server;
validating authenticity whether the user has permission to deploy the release into the production server by verifying the user's credentials with pre-stored credential information; and
executing deployment of the release into the production server based on a positive verification.

8. A system for implementing a release automation dashboard module, the system comprising:
a database that stores a set of Sarbanes-Oxley (SOX) audit rules; and
a processor coupled to the database via a communication network, wherein the processor is configured to:
create a release;
check, in response to create, the release for violations against the set of Sarbanes-Oxley (SOX) audit rules;

determine, in response to check, whether the release complies with the SOX audit rules;
scan, in response to determine that the release complies with the SOX audit rules, the release for cyber vulnerabilities in accordance with an organization's established practices;
validate, in response to scan, that the release is scanned for cyber vulnerabilities in accordance with the organization's established practices;
authorize, in response to validate, deployment of the release based on a determination that one or more features from the release does not violate the set of SOX audit rules and that the one or more features from the release meet a predetermined threshold for the cyber vulnerabilities;
create a release label corresponding to the release in a project management tool;
create a release branch corresponding to the release in a version control system; and
display status and summary of the release on a graphical user interface (GUI) corresponding to the release label and the release branch,
wherein the GUI displays cyber issues related to the release in a table format that illustrates status of the release as scannable components have not been scanned, wherein the table includes a column for component, a column for non-volatile storage hyperlinked to a private cloud build, a column for existing product vulnerabilities, and a column for vulnerability changes in the release.

9. The system according to claim 8, wherein the release label corresponds to a version of a software including owner information of the release which is represented in the project management tool.

10. The system according to claim 8, wherein each feature is a unit of functionality of a software system that satisfies requirements, represents a design decision, and provides a configuration option.

11. The system according to claim 8, wherein the processor is further configured to:
determine that one or more of the features violate the set of SOX audit rules; and
notify a user of the release, by utilizing an electronic messaging tool, thea status of the release and a list of violations of the SOX audit rules.

12. The system according to claim 8, wherein the processor is further configured to:
identify one or more features of the release that violate the set of SOX audit rules; and
discard the identified one or more features that violate the set of SOX audit rules from the release.

13. The system according to claim 8, wherein the processor is further configured to:
identify one or more features from the release that fail to meet the predetermined threshold for the cyber vulnerabilities; and
display the identified one or more features that fail to meet the predetermined threshold for the cyber vulnerabilities onto a graphical user interface (GUI).

14. The system according to claim 8, wherein the processor is further configured to:
receive a request from a user's device to deploy the release into a production server;
validate authenticity whether the user has permission to deploy the release into the production server by verifying the user's credentials with pre-stored credential information; and
execute deployment of the release into the production server based on a positive verification.

15. A non-transitory computer readable medium configured to store instructions for implementing a release automation dashboard module, wherein, when executed, the instructions cause a processor to perform the following:
creating a release;
checking, in response to creating, the release for violations against a set of Sarbanes-Oxley (SOX) audit rules;
determining, in response to checking, whether the release complies with the SOX audit rules;
scanning, in response to determining that the release complies with the SOX audit rules, the release for cyber vulnerabilities in accordance with an organization's established practices;
validating, in response to scanning, that the release is scanned for cyber vulnerabilities in accordance with the organization's established practices;
authorizing, in response to validating, deployment of the release based on a determination that the one or more features from the release does not violate the set of SOX audit rules and that one or more features from the release meet a predetermined threshold for the cyber vulnerabilities;
creating a release label corresponding to the release in a project management tool;
creating a release branch corresponding to the release in a version control system; and
displaying status and summary of the release on a graphical user interface (GUI) corresponding to the release label and the release branch,
wherein the GUI displays cyber issues related to the release in a table format that illustrates status of the release as scannable components have not been scanned, wherein the table includes a column for component, a column for non-volatile storage hyperlinked to a private cloud build, a column for existing product vulnerabilities, and a column for vulnerability changes in the release.

16. The non-transitory computer readable medium according to claim 15, wherein the instructions, when executed, further cause the processor to perform the following:
determining that one or more of the features violate the set of SOX audit rules; and
notifying a user of the release, by utilizing an electronic messaging tool, a status of the release and a list of violations of the SOX audit rules.

17. The non-transitory computer readable medium according to claim 15, wherein the instructions, when executed, further cause the processor to perform the following:
identifying one or more features from the release that fail to meet the predetermined threshold for the cyber vulnerabilities; and
displaying the identified one or more features that fail to meet the predetermined threshold for the cyber vulnerabilities onto a graphical user interface (GUI).

18. The non-transitory computer readable medium according to claim 15, wherein the instructions, when executed, further cause the processor to perform the following:
receiving a request from a user's device to deploy the release into a production server;

validating authenticity whether the user has permission to deploy the release into the production server by verifying the user's credentials with pre-stored credential information; and executing deployment of the release into the production server based on a positive verification.

\* \* \* \* \*